(12) United States Patent
Reynaud et al.

(10) Patent No.: US 11,810,688 B2
(45) Date of Patent: Nov. 7, 2023

(54) STRETCHABLE CONDUCTIVE NANOCOMPOSITE PARTICLES

(71) Applicants: UNIVERSITE DE PAU ET DES PAYS DE L'ADOUR, Pau (FR); CENTRE NATIONAL DE LA RECHERCHE SCIENTIFIQUE, Paris (FR)

(72) Inventors: Stéphanie Reynaud, Lons (FR); Pierre Marcasuzaa, Lons (FR)

(73) Assignees: UNIVERSITE DE PAU ET DES PAYS DE L'ADOUR, Pau (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 112 days.

(21) Appl. No.: 17/442,424

(22) PCT Filed: Apr. 30, 2020

(86) PCT No.: PCT/EP2020/062011
§ 371 (c)(1),
(2) Date: Sep. 24, 2021

(87) PCT Pub. No.: WO2020/221853
PCT Pub. Date: Nov. 5, 2020

(65) Prior Publication Data
US 2022/0189653 A1 Jun. 16, 2022

(30) Foreign Application Priority Data

May 2, 2019 (FR) ...................................... 1904606

(51) Int. Cl.
*H01B 1/12* (2006.01)
*C08J 5/04* (2006.01)
(Continued)

(52) U.S. Cl.
CPC ................ *H01B 1/12* (2013.01); *C08J 5/046* (2013.01); *C08L 33/08* (2013.01); *C08L 33/26* (2013.01);
(Continued)

(58) Field of Classification Search
CPC .............. C08G 73/0266; C08J 2333/08; C08J 2333/26; C08J 2379/02; C08J 5/046;
(Continued)

(56) References Cited

U.S. PATENT DOCUMENTS 6,248,449 B1 * 6/2001 Watanabe ................ H01B 1/22
428/209
2009/0212263 A1 8/2009 Reynaud et al.
(Continued)

FOREIGN PATENT DOCUMENTS

FR       2993098          1/2014
WO   2007012736 A2    2/2007
(Continued)

OTHER PUBLICATIONS

Lang WU, et al., "Enhanced electrical conductivity and competent mechanical properties of polyaniline/polyacrylate (PANI/PA) composites for antistatic finishing prepared at the aid of polymeric stabilizer", Progress in Organic Coatings, Elsevier BV, NL,vol. 125, Sep. 1, 2018; 10 pgs.
(Continued)

*Primary Examiner* — Mark Kopec
*Assistant Examiner* — Jaison P Thomas
(74) *Attorney, Agent, or Firm* — Maier & Maier, PLLC

(57) ABSTRACT

Electrically conductive nanocomposite particles including a core of a C1-C6 alkyl polyacrylate homopolymer or a copolymer of C1-C6 alkyl acrylate and of an α,β-unsaturated amide comonomer, a shell of polyaniline, and a non-ionic surfactant, for printing on a stretchable substrate.
(Continued)

Also, a printed stretchable substrate obtained from the electrically conductive nanocomposite particles, which is usable, for example, in the field of printed electronics or connected clothing.

9 Claims, 4 Drawing Sheets

(51) Int. Cl.
*C08L 33/08* (2006.01)
*C08L 33/26* (2006.01)
*C08L 79/02* (2006.01)

(52) U.S. Cl.
CPC ............ *C08L 79/02* (2013.01); *C08J 2333/08* (2013.01); *C08J 2333/26* (2013.01); *C08J 2379/02* (2013.01); *C08L 2203/20* (2013.01)

(58) Field of Classification Search
CPC ...... C08L 2203/20; C08L 33/08; C08L 33/26; C08L 79/02; C09D 11/52; C09D 179/02; H01B 1/12
See application file for complete search history.

(56) References Cited

U.S. PATENT DOCUMENTS

| | | | |
|---|---|---|---|
| 2014/0249526 A1* | 9/2014 | Kotov | .................. A61L 31/125 252/514 |
| 2015/0340699 A1 | 11/2015 | Chami et al. | |
| 2019/0053372 A1* | 2/2019 | Kwon | ...................... A61B 5/25 |

FOREIGN PATENT DOCUMENTS

| | | |
|---|---|---|
| WO | 2007111996 A2 | 10/2007 |
| WO | 2012169768 A2 | 12/2012 |

OTHER PUBLICATIONS

Notification of Transmittal of the International Search Report and the Written Opinion of the International Searching Authority dated Aug. 24, 2020, in connection with corresponding international Application No. PCT/ EP2020/062011; with English translation; 7 pgs.

* cited by examiner

STRETCHABLE CONDUCTIVE NANOCOMPOSITE PARTICLES

FIELD OF INVENTION

The present invention relates to the technical field of stretchable conductive materials, in particular for the fields of printed electronics requiring elasticity.

BACKGROUND

The presence of electronics in our lives continues to increase, and this trend is expected to be exponential in the years to come, with the arrival of the Internet of Things (IoT, Internet of Things), and the next Internet of Things. all objects (IoE, Internet of Everything).

The IoE can be implemented thanks to the latest technological advancements, and mainly to the advancements acquired in the world of printed electronics. Printed electronics allow the production of flexible components and printing on large surfaces, in particular as a complement to traditional electronics on silica. The main differences in the devices obtained with traditional semiconductor technologies are in their thickness, weight, robustness and cost. These qualities have allowed the emergence of new markets and products, and have contributed to the development of innovative concepts such as portable electronics or smart labels. In order to be able to continue this development, there are still technological obstacles to be removed with new technological approaches. In particular, there is now a growing interest in stretchable and flexible substrates, especially for "wearables", such as connected clothing.

The solutions industrially applied in stretchable electronics today follow two approaches: on the one hand circuit engineering, with tracks drawn in the shape of waves and horseshoes, and on the other hand nanocomposites of conductive nanoparticles, typically metallic nanoparticles or carbon nanotubes, embedded in an insulating elastomeric matrix, and combinations of the two approaches. These two approaches have significant performance limitations and the properties are little or not kept under mechanical stress. The development of these materials is further limited by the complexity of manufacturing the devices. In the first approach, an inorganic non-stretchable material, typically a metal, is structured according to a geometric wave pattern, which can be stretched if the elastomeric substrate is deformed. The feasibility has been demonstrated, but the manufacturing complexity and the space occupied by the circuits on the devices represent significant constraints. In the second approach, nanocomposites take advantage of the inclusion of conductive fillers in insulating elastomer matrices. Materials like carbon nanotubes, silver nanowires or metallic nanoparticles are used as conductive materials. Despite the versatility and the large number of material choices, the percolation dependent conductivity is highly sensitive to tension and remains an obstacle for the miniaturization of the device and the stability under cyclic deformation.

The developments carried out in recent years for applications in stretchable printed electronics, such as epidermal electronics, allow intimate contact between devices and curvilinear surfaces, with 100% deformation. The most successful concept for these devices is based on the integration of rigid islands of active components with stretchable interconnects. But the development of conductors capable of maintaining conduction performance under strain remains a key challenge.

In this context, inherently stretchable and conductive materials remain scarce, but if successful, they will open up simple manufacturing processes, such as printing or coatings. Nevertheless, several obstacles remain to be overcome: their development taking into account inexpensive and easy ways, their implementation, as well as the robustness of their properties under deformation.

An inherently stretchable and conductive material capable of being deposited as a solution and capable of printing a pattern is further desirable.

Conductive polymers are good candidates due to their flexibility and their electrical and mechanical properties. Unfortunately, to date, high conductivity and high stretchability could not be achieved simultaneously for conductive polymers. Poly (3,4-ethylenedioxythiophene): sodium poly (styrene sulfonate) (PEDOT:PSS) is the conductive polymer with the highest conductivity which can be deposited as a solution, but it exhibits fracture at deformation around 5%.

The application WO2007/012736 describes electrically conductive nanocomposite particles having a polyalkyl acrylate core and a polyaniline shell. The particles make it possible to obtain composites having both high conductivity and good film-forming properties. However, no stretchability property has been demonstrated for these particles, let alone the maintaining of their conductive properties when stretched.

In this context, the Applicant has demonstrated that electrically conductive nanocomposite particles having a polyalkyl acrylate core and a polyaniline shell unexpectedly make it possible to obtain a composite whose initially high electrical conductivity is retained upon stretching. Thus, the core-shell architecture of the composite makes it possible to obtain an electrical continuum up to an elongation of 300%.

SUMMARY

First of all, the present application relates to the use of electrically conductive nanocomposite particles comprising a core consisting of a homopolymer of C1-C6 alkyl polyacrylate or of a copolymer of C1-C6 alkyl acrylate and of an α,β-unsaturated amide comonomer, and a shell consisting of polyaniline, and a nonionic surfactant for printing on a stretchable support.

A second object of the invention is a printed stretchable support, in which the printed part comprises at least one electrically conductive nanocomposite particle comprising a core consisting of a homopolymer of C1-C6 alkyl polyacrylate or of a copolymer of C1-C6 alkyl acrylate and of an α,β-unsaturated amide comonomer, and a shell consisting of polyaniline, and a nonionic surfactant.

Finally, the present application relates to electrically conductive nanocomposite particles comprising a core consisting of a homopolymer of C1-C6 alkyl polyacrylate or of a copolymer of C1-C6 alkyl acrylate and of an α,β-unsaturated amide comonomer, a shell consisting of polyaniline, and a nonionic surfactant, in which a characteristic dimension of the core, in particular its diameter, is strictly less than 200 nm.

BRIEF DESCRIPTION OF THE DRAWINGS

In addition, various other characteristics of the invention rise from the appended description given with reference to the drawings which illustrate non-limiting embodiments of the invention, wherein.

DETAILED DESCRIPTION

Figure 1:
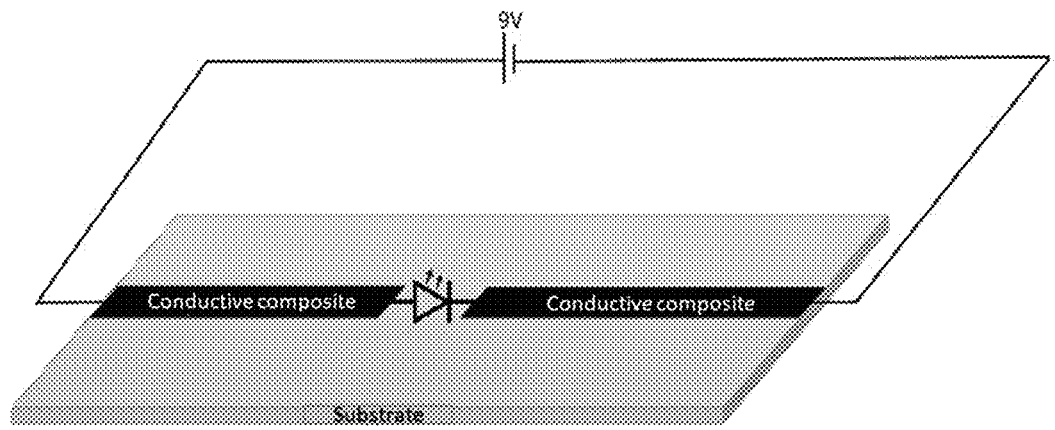
FIG. 1 is a layout of the device for viewing the conductivity of stretchable substrates according to the invention.

The present application relates firstly to the use of electrically conductive nanocomposite particles comprising a core consisting of a homopolymer of poly C1-C6 alkyl acrylate or a copolymer of C1-C6 alkyl acrylate and of an α,β-unsaturated amide comonomer, a shell consisting of polyaniline, and a nonionic surfactant to produce a printing on a stretchable support.

It also relates to the use of electrically conductive nanocomposite particles comprising a core consisting of a homopolymer of C1-C6 alkyl polyacrylate or of a C1-C6 alkyl acrylate copolymer and of an α,β-unsaturated amide comonomer, a shell consisting of polyaniline, and a nonionic surfactant for depositing the nanocomposite particles on a stretchable support.

The term "nanocomposite" is understood as composite particles of size less than one micrometer. The size (diameter) of the core is generally in the range of 20 nm to 700 nm and the size (thickness) of the shell is generally in the range of a few nm to 100 nm. The terms "nanocomposite" and "composite" are used interchangeably in the present application to denote this nanocomposite. In a preferred embodiment, the particles used according to the invention have a core diameter of less than 200 nm. The diameter here corresponds to the hydrodynamic size of the particles in suspension, and can be measured by dynamic light scattering or by thin film. The small size of the core and therefore of the resulting particles advantageously makes it possible to promote the formation of conduction paths in the subsequent composite material. It also makes it possible to prepare very thin composite films and to promote the application of the dispersions, for example by spraying.

By "polyaniline" is meant polyaniline or one of its derivatives. Polyaniline derivatives are polymers in which the aniline monomer units are substituted, for example on the nitrogen or on the aromatic ring. Examples of substituents on the aromatic ring are in particular the hydroxy group, halogen atoms, in particular chlorine atoms, C1 to C4 alkyl groups, in particular methyl, ethyl and isopropyl, and C1 to C4 alkoxy groups such as methoxy, ethoxy, n- or isopropoxy and n-, iso- or tert-butoxy. The nitrogen atom may be, for example, substituted by one or more C1 to C4 alkyl group(s).

The term "shell consisting of polyaniline" is understood as a continuous or discontinuous deposit consisting of polyaniline physically bonded (i.e. adsorbed) and/or chemically (i.e. grafted) to the surface of the core of polyalkylacrylate or of the copolymer of C1-C6 alkyl acrylate and α,β unsaturated amide comonomer. Preferably, this deposit is discontinuous. Preferably, the shell is adsorbed on the surface of the core.

A "polyalkyl acrylate homopolymer" means a polymer resulting from the linking of several identical alkyl acrylate monomer units.

Within the meaning of the present description, the term "polyalkyl acrylate" encompasses polyalkyl methacrylates. The terms "C1 to C6 alkyl" denote linear or branched saturated hydrocarbon chains comprising from 1 to 6 carbon atoms (end-points included), notably comprising 1, 2, 3, 4, 5 or 6 carbon atoms. As examples of C1 to C6 alkyl polyacrylates, mention may in particular be made of polymethyl methacrylate, methyl polyacrylate, ethyl polyacrylate, ethyl polymethacrylate, n-propyl or isopropyl polyacrylate, n-propyl or isopropyl polymethacrylate, n-, sec- or tert-butyl polyacrylate and n-, sec- or tert-butyl polymethacrylate. Preferably, the C1 to C6 alkyl polyacrylate is n-butyl polyacrylate. The latter advantageously has a glass transition temperature of −54° C., that makes it possible to obtain film-forming properties at room temperature. According to a variant of the invention, the polyalkyl acrylate is at least partially crosslinked. Examples of particularly suitable crosslinking agents are in particular diacrylate compounds, preferably 1,6 hexanediol diacrylate. The latter is available in particular under the trade name SR238 ® (Cray Valley). The crosslinking of the polyalkyl acrylate can make it possible to modulate the mechanical properties of the conductive composite and in particular to modulate its elasticity.

According to a preferred variant of the invention, the core consists of a copolymer of C1 to C6 alkyl acrylate and of an α,β-unsaturated amide comonomer. It has in fact been demonstrated that the presence of the amide functions on the core particles makes it possible to improve the compatibility with the polyaniline shell and therefore improve the covering of the core as well as the conductivity. Thus, without wishing to be limited to a theory, it has been demonstrated that the presence of amide functions promotes the establishment of hydrogen bonds with polyaniline. Within the meaning of this specification, the terms "α,β-unsaturated amide comonomer" encompasses α,β-unsaturated amides or their derivatives. Preferably, the α,β-unsaturated amide is ethylenically unsaturated, and more preferably it is acrylamide. The unsaturated amide derivatives are monomers substituted on the double or triple bond, for example by alkyl groups such as methyl, ethyl and propyl. As an example of an α,β-unsaturated amide derivative, mention may in particular be made of acrylamide and its derivatives such as methacrylamide. The copolymer of C1-C6 polyalkyl acrylate and α,β-unsaturated amide comonomer can be a block, graft or random copolymer. Preferably, the weight ratio of alkyl acrylate type monomer/α,β-unsaturated amide comonomer varies from 90/10 to 99.5/0.5.

Preferably, the weight ratio of polyalkyl acrylate/polyaniline, or of copolymer of alkyl acrylate with an α,β-unsaturated amide comonomer/polyaniline varies from 45/55 to 98/2 and is preferably between 50/50 and 95/5. In particular, the weight ratio of polyalkyl acrylate/polyaniline or of copolymer of alkyl acrylate with an α,β-unsaturated amide comonomer/polyaniline varies from 70/30 to 95/5, in particular it is equal to about 75/25, in particular it is equal to 75/25.

The particles used according to the invention can be obtained by polymerization of the polyaniline in a dispersion of polyalkyl acrylate (or of copolymer of an alkyl acrylate/α,β-unsaturated amide comonomer) stabilized by the presence of a surfactant. The surfactant is preferably a nonionic surfactant, optionally mixed with at least one other nonionic or ionic surfactant, in particular cationic surfactant. It is preferably nonionic surfactant because ionic surfactants can undesirably interfere with the polymerization reactions, particularly during the polymerization of polyaniline.

By "nonionic surfactant" is meant a surfactant which is uncharged under the operating conditions. The nonionic surfactant can be physically adsorbed to the surface of the polyalkylacrylate particles (i.e. physically bound) or incorporated into the polyalkylacrylate (i.e. chemically bound). Preferably, the nonionic surfactant is physically bonded to the polyalkylacrylate. This can be achieved by carrying out the polymerization of the polyalkylacrylate in the presence of the nonionic surfactant.

The nonionic surfactant can be chosen from a wide variety of compounds including in particular alkylphenol alkoxylates, alcohol alkoxylates, alkyl alkoxylates, amine alkoxylates, alkyl amine oxides, in particular from alkylphenol ethoxylates, alcohol ethoxylates, alkyl ethoxylates, or EO/PO (oxide of ethylene/propylene oxide) block copolymers, amine ethoxylates or amine polyethoxylates.

The nonionic surfactant preferably has a hydrophilic/lipophilic balance (HLB) between 12 and 20, in particular between 17 and 19, end-points included. In particular, it may be the surfactant known under the name Brij™ S100, of formula I:

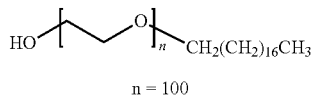

n = 100

The amount of nonionic surfactant used is not critical and can vary to a large extent. Thus, dispersions of small particles generally require a higher amount of stabilizing surfactant than dispersions of larger particles. However, this amount must be sufficient to make it possible to stabilize the polyalkylacrylate particles and must not be too large so as not to alter the mechanical and conductive properties of the particles. The nonionic surfactant present in the particles according to the invention generally represents 1% to 20% by mass, and more preferably from 1 to 10% by mass, the values by mass being expressed relative to the total dry mass of the shell and the core.

According to a particularly preferred variant of the invention, the particles further comprise a second nonionic surfactant having chemical functions capable of improving the conductivity of the composite. By way of examples, mention may be made of nonionic surfactants comprising at least one amide function, such as the compounds of formula II:

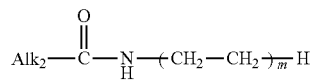

In formula II, $Alk_2$ denotes a C1-C20, preferably C1-C15, alkyl group, and m represents an integer from 1 to 100. According to a preferred variant, a compound corresponding to formula II is used, in which $Alk_2$ is a C11 alkyl group and m represents an average number of 6. This is commercially available under the name Ninol® (Stepan). Thus, without wishing to be limited to a theory, it has been demonstrated that the amide functions present at the surface of the core make it possible to obtain better coverage of the core particle and also allow the establishment of hydrogen bonds with the polyaniline. These properties therefore make it possible to improve the conductivity.

Preferably, this second nonionic surfactant represents 1% to 20% by mass relative to the dry mass of the shell and of the core.

The particles used according to the invention may alternatively comprise a second ionic surfactant, in particular a second cationic surfactant so as not to create charge incompatibility between the conductive polymer and the second ionic surfactant. For example, the cationic surfactant can be chosen from surfactants of the family of alkyltrimethylammoniums, in particular C4 to C20 alkyltrimethylammoniums. In particular, it can be dodecyltrimethylammonium bromide (DTAB).

Preferably, this second ionic surfactant represents 1% to 20% by mass relative to the dry mass of the shell and of the core.

In the case where the particles comprise a first nonionic surfactant and a second nonionic or ionic surfactant, the mass ratio between the first nonionic surfactant and the second nonionic or ionic surfactant is preferably between 50/50 and 30/70, end-points included.

The particles can in particular be synthesized by the process described in the WO2007/012736 application.

The particles can be used in the form of a dispersion, in particular a dispersion in an aqueous medium, in particular in water. The solid content of the dispersion of particles is generally between 1 and 60% by weight of the dispersion, preferably 10 to 40% by weight.

The term "stretchable support" denotes a material which can withstand an elongation of at least 120% in at least one direction without breaking, and on which the nanocomposite particles according to the invention, or a film formed from such particles, can be printed. Preferably, the stretchable material can withstand elongation in at least one direction of at least 150%, at least 200%, at least 250%, at least 300% or at least 500%. In some embodiments, the stretchable support may include a greater degree of stretchability in a first direction than in a second direction of the same plane.

As examples of stretchable supports which can be used according to the invention, mention may be made of thermoplastic polymers, such as polypropylene, polyurethane, poly (ethylene terephthalate) or polyethylene. Elastomeric fibers and fabrics comprising such fibers can also be mentioned. Elastomeric fibers are known to be able to be stretched by at least 400% and then be able to recover their original shape. As examples of elastomeric fibers, mention may be made of elastane fibers (for example Lycra), natural or synthetic rubber fibers, olefins, polyesters, polyethers or their combinations, in particular elastic fibers comprising elastane and polyester. Stretchable supports comprising at least one of the examples of supports mentioned above, even if they do not consist thereof, can also be used according to the invention.

In one embodiment, the printed stretchable support is selected from the group consisting of polypropylene, polyurethane, poly (ethylene terephthalate), polyethylene, elastane fibers, natural or synthetic rubber fibers, olefins, polyesters, polyethers or combinations thereof.

The term "printing" with a nanocomposite on a support is understood as depositing the nanocomposite on the substrate, for example by depositing a film of the nanocomposite or by impregnating the fibers of the substrate with the nanocomposite particles, or with a dispersion nanocomposite particles in a solvent, preferably with the nanocomposite particles in their synthesis medium. The deposit can be carried out by any suitable technique known to those skilled in the art. For the deposition of a film, mention may in particular be made of the deposition by drops (drop casting), screen printing or deposition with a "Doctor Blade" type equipment.

In one embodiment, the printing is carried out by depositing the nanocomposite particles on the support in the form of a film, or by impregnating all or part of the fibers of the support with a solution or a suspension comprising the nanocomposite particles and at least a solvent.

The Applicant has demonstrated that, unexpectedly, the use of the particles described above or of a dispersion containing them for printing on a stretchable support makes it possible to obtain a print that is both stretchable and conductive, that is, its conduction properties are retained even when the stretchable support is stretched, especially up to an elongation of more than 300%. In addition, the conduction properties are also maintained upon release to the unstretched state of the stretchable carrier, as well as after several cycles of elongation/releasing to the unstretched state.

A second object of the invention is a printed stretchable support, in which the printing comprises at least one electrically conductive nanocomposite particle comprising a core consisting of a homopolymer of C1-C6 alkyl polyacrylate or of a copolymer of C1-C6 alkyl acrylate and of an α,β-unsaturated amide comonomer, a shell consisting of polyaniline, and a nonionic surfactant.

The printed stretchable support according to the invention can obviously have each of the characteristics and take up the preferred embodiments described in the section relating to the use of nanocomposite particles for printing on a stretchable support.

The printed stretchable support according to the invention can be used as such as a stretchable conductive material. In some cases, it can also be used to form stretchable electrodes.

The present application finally relates to electrically conductive nanocomposite particles comprising a core consisting of a homopolymer of C1-C6 alkyl polyacrylate or of a copolymer of C1-C6 alkyl acrylate and of an α,β-unsaturated amide comonomer, a shell consisting of polyaniline, and a nonionic surfactant, in which a characteristic dimension of the core, in particular its diameter, is strictly less than 200 nm.

The various characteristics and preferred embodiments described in the section relating to the use of nanocomposite particles for printing on a stretchable support can obviously be used to characterize the nanocomposite particles according to the invention, provided that they are not contradictory with their definition.

The nanocomposite particles according to the invention, whose characteristic core dimension, in particular the diameter, is less than 200 nm, have demonstrated superiority over particles whose core is larger with regard to their use for deposition on a stretchable support. Compared to particles, such as those described in the aforementioned prior application WO2007/012736, they have advantages in terms of implementation (deposition in the form of a film or of impregnation which is easier to produce), of material saving (less polyaniline necessary to achieve percolation rates similar to those of the prior art) and conductivity. Without wishing to be bound by any theory, it would appear that the use of smaller conductive particles allows a tighter network of conductive polymer to be formed within the film or the impregnation deposit, which would promote conduction.

The printed conductive substrate according to the invention can be used in a wide variety of fields such as wearable technologies (clothing or accessories comprising advanced computer and electronic elements, referred to as "wearables" in English), printed electronics, but also coatings for housing or household appliances. For example, devices such as presence detectors and step sensors have been obtained according to the invention.

A final object of the present invention is the use as a stretchable conductive material, for the same applications as the printed conductive substrate according to the invention, of a film of nanocomposite particles as described in the present invention.

In the present invention, unless otherwise specified, the term "about" a value v1 denotes a value comprised in a range between 0.9×v1 and 1.1×v1, that is to say v1±10%, preferably v1±5%, in particular v1±1%.

In the present invention, unless otherwise specified, the intervals of values denote the open intervals not including their end-points. Thus, the terms "greater than" and "less than" refer to strict inequalities.

In the present invention, unless otherwise specified, the verb "comprise" and its variations should be understood as not excluding the presence of other components. In particular embodiments, these terms can be interpreted as "consisting essentially of" or "consisting of".

Of course, the different characteristics, variants and embodiments of the invention can be associated with each other in various combinations insofar as they are not incompatible or mutually exclusive.

Of course, various other modifications can be made to the invention within the scope of the appended claims.

The examples provided below are intended to illustrate the invention without limiting its scope.

EXAMPLES

Example 1: Synthesis of the Particles which can be Used According to the Invention Particles with a polybutylacrylate (PBuA) latex core and polyaniline (PANI) shell were synthesized. The method used is adapted from that described in WO2007/012736.

1.1 Core Synthesis

First, the surfactants were introduced into the water and stirred until complete solubilization. After solubilization, the acryl butoxide monomer was added with stirring and the reaction system was heated using an oil bath or double jacket at 70° C. When the emulsion was stabilized, the ammonium persulfate initiator was added. The reaction time was 4 hours.

The synthesis is carried out in water. Table 1 below summarizes the different conditions used in terms of the nature of surfactants (TA=surfactant), quantity of surfactants (TA m %=percentage by mass of surfactant and TA1/TA2=mass ratio of the 2 surfactants used), solid content, as well as the diameter of the obtained particles (latex). These particles represent the core of the electrically conductive composite particles used according to the invention.

TABLE 1

| Assay | TA1 | TA2 | TA m % | TA1/TA2 | Solids percentage | Diameter (nm) |
|---|---|---|---|---|---|---|
| 1 | Ninol L5 | NP40 | 4 | 35/65 | 30 mol % | 260 |
| 2 | Ninol L5 | BrijS100 | 4 | 35/65 | 30 mol % | 190 |
| 3 | Ninol L5 | BrijS100 | 6 | 35/65 | 30 mol % | 180 |
| 4 | DTAB | BrijS100 | 8 | 50/50 | 10 mol % | 120 |

The particles of assay 1 of Table 1 are obtained according to the conditions of WO2007/012736 application.

1.2 Synthesis of Polyaniline Shell (PANI)

PANI shell was obtained using the following protocol. The desired amount of aniline hydrochloride was dissolved in the volume of water required for the synthesis, then the core as synthesized in the previous step was added with stirring. The reaction system was cooled to 5° C. via an ice bath (flask synthesis) or using a cryostat connected to the jacket in the case of reactor synthesis. After 15 minutes of temperature stabilization, the aqueous solution of ammonium persulfate was added dropwise in order to control the exothermy due to mixing. After 5 h at 5° C., the reaction was stopped. The introduced amounts were determined as a function of the desired PBuA/PANI ratio as well as the targeted level of solids percentage.

Example 2: Deposition of the Composite on Various Substrates and Measurement of Conductivity In this part, the objective is to visually verify the electrical continuity of the device using a light-emitting diode (LED) inserted in a circuit where the metal cables are replaced by the composite. To do this, an LED is connected to two strips of conductive composite which are themselves connected to a power supply. The layout of the device is provided in FIG. 1.

The following two conductive composites were used: (a) particle composite with a PBuA/PANI ratio of 75/25, a core diameter of about 120 nm, a mixture of BrijS100 and DTAB surfactants (assay 4 of Table 1), and a conductivity of 1.6 S/cm, and (b) composite of particles with a PBuA/PANI ratio of 70/30, a core diameter of about 180 nm, a mixture of BrijS 100 and Ninol L5 surfactants (assay 3 of Table 1), and a conductivity of 1 S/cm.

Figure 2:
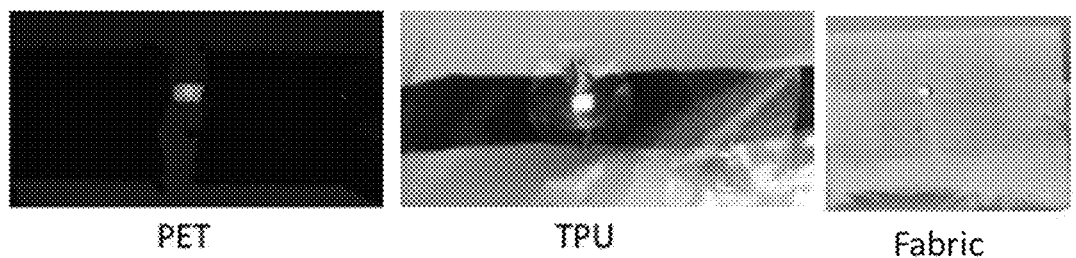
FIG. 2 is a photograph of the devices for verifying the electrical continuity obtained with the printed substrates according to the invention.

Various substrates have been tested such as PET, TPU and fabric. In all cases, whatever the support and whatever the composite used, a homogeneous and regular deposit is obtained allowing an electrical continuum to be obtained and therefore the illumination of the LED. FIG. 2 shows a photo of the devices with the different tested substrates.

Example 3: Measurement of the Resistance to Stretching of Composite Films and Substrates on which the Composites are Deposited a) Deposition on a Thermoplastic Polyurethane Substrate A first series of tests was carried out on thermoplastic polyurethane (TPU) in order to assess the variation in resistance as a function of stretching. A composite film (a) of particles with a PBuA/PANI ratio of 75/25, a core diameter of about 120 nm, a mixture of BrijS100 and DTAB surfactants (assay 4 of Table 1), and a conductivity of 1.6 S/cm was deposited on a polyurethane substrate by drop casting. On a separate substrate, a film of composite (b) of particles with a PBuA/PANI ratio of 70/30, a core diameter of about 180 nm, a mixture of BrijS 100 and Ninol L5 surfactants (assay 3 of Table 1), and a conductivity of 1 S/cm was deposited by drop casting as well. In order to measure resistance under stretching, the test piece is placed between two jaws of a Versatest motorized bench. The lower jaw is fixed and the upper jaw is mobile. The electrical contact is provided by gold needles which are in contact with the film inside the jaw while the resistance measurement is made by a keithley. The traction arm and keithley are connected to an acquisition software that allows the control of the stretching. Thus, tensile cycles can be performed while measuring resistance.

Stretching Test Protocol

Figure 3:
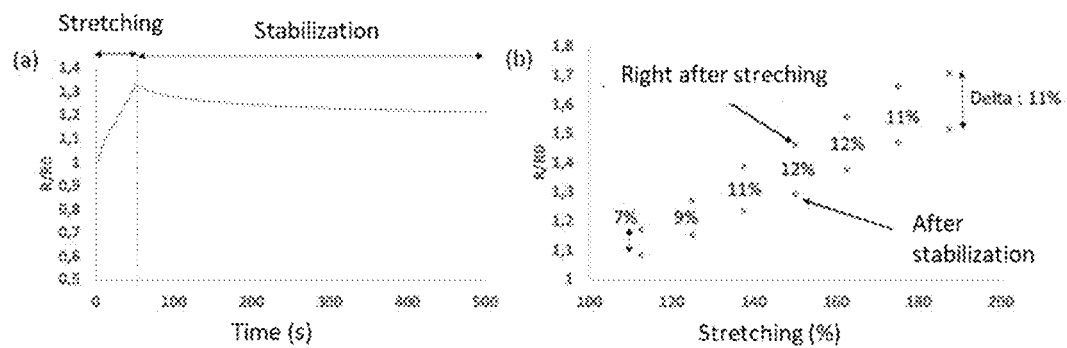
FIG. 3 is a graph showing the evolution of the resistance of the printed thermoplastic polyurethane test piece during the tensile test as a function of time (a) and stretching (b)

This test consists in determining the value of the resistance under stretching. Two phases of stretching are studied, the first during stretching (50 mm/min), when the traction arm is in motion, and the second after stretching the test piece. The resistance of a sample is proportional to the ratio between the length (distance between the electrodes) of the test piece and its section (product of width and thickness). When stretching, the length increases and the section decreases, resulting in an increase in the resistance value. Then, once stretched, relaxation takes place, leading to a decrease in the resistance value. Whether it is the value after stretching or the value after relaxation, the variation is linear depending on the stretch to which the test piece is subjected. In addition, the difference in the resistance value between after stretching and after relaxation is approximately 11%. FIG. 3 shows the evolution of the resistance of the test piece as a function of time, and as a function of stretching.

Figure 4:
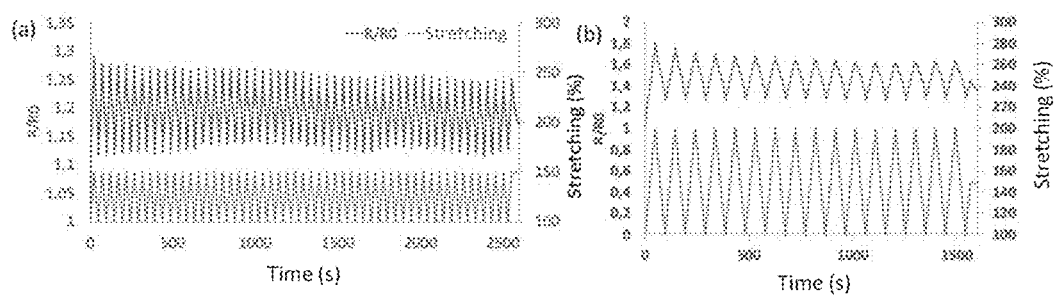
FIG. 4 is a graph showing the evolution of the resistance (upper part) and the stretching (lower part) of the thermoplastic polyurethane test piece printed during the stretching/release cycles.

The test piece is also subjected to tensile-release cycles while measuring resistance. FIG. 4 shows the evolution of the resistance of the test piece (top curve) and stretch (bottom curve) as a function of time during tensile cycles. During these cycles, the stretch is between 100% (relaxed position) and 150% (a) or 200% (b). The variation in resistance changes with the variation in position to reach values from extremum to the relaxed and stretched position. Beyond the value of the resistance itself, it is important to note that during this stretch-release process the value of the resistance changes because of the difference in geometry of the test piece and not because of loss of percolation. In addition, the maximum and minimum values obtained during the different cycles are close to each other, which shows that the specimen does not deteriorate during the different stretches. The fact that resistance can be measured during stretch/release cycles confirms that the material retains its conductivity when stretched. Indeed, should it no have been the case, the electrical continuum would be broken and a resistance would no longer be able to be measured. Therefore, the composite film deposited on the substrate is stretchable and does not undergo degradation, and its conductivity is maintained even after several stretch/release cycles.

Figure 5:
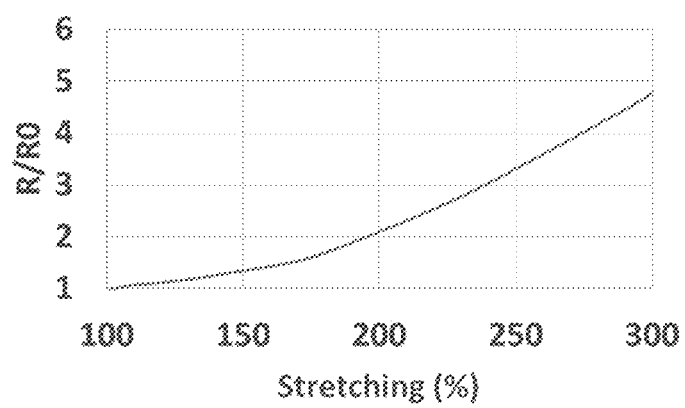
FIG. 5 is a graph showing the evolution of the resistance of the printed thermoplastic polyurethane test piece during stretching up to 300%.

FIG. 5 shows that up to 300% stretching can be achieved with the test piece without degradation of the composite or loss of conductivity.

b) Deposition on a Stretchable Polyester Textile Substrate

Figure 6:
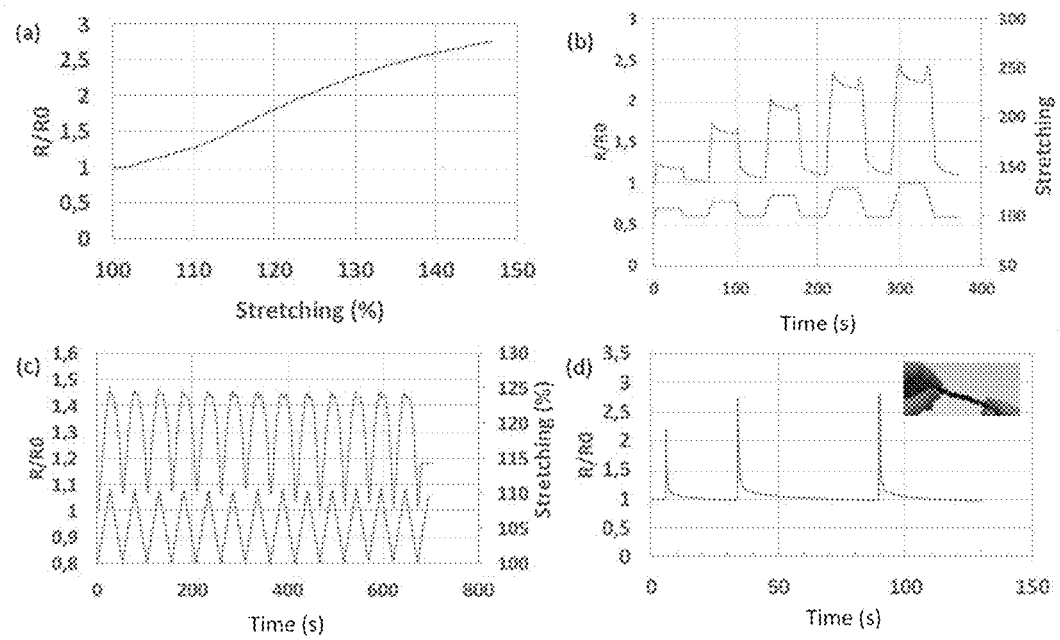
FIG. 6 is a graph showing the evolution of the resistance (upper part) and of the stretching (lower part) of the printed test piece of stretchable textile during a single stretching (a) and during stretching/release cycles (b, c and d)

The conductive composite is deposited on a stretchable polyester fabric by impregnation of the fibers with the conductive polymer. The stretchability of polyester is due to weaving manner of the polyester fibers, since the polyester fibers are not inherently stretchable. The deposition was carried out for the two conductive composites of Example 2, that is to say: (a) composite of particles with a PBuA/PANI ratio of 75/25, a core diameter of approximately 120 nm, a mixture of BrijS 100 and DTAB surfactants (assay 4 of Table 1), and a conductivity of 1.6 S/cm, and (b) composite of particles with a PBuA/PANI ratio of 70/30, a core diameter of about 180 nm, a mixture of BrijS100 and Ninol L5 surfactants (assay 3 of Table 1), and a conductivity of 1 S/cm. For each of the composites tested, a behavior similar to the behavior obtained for the thermoplastic polyurethane substrate on which the composite is deposited was observed, that is to say an increase in the value of the resistance during stretching. When the composite impregnated fabric is stretched and kept stretched, stabilization is also observed, then when the stretch is released, the value decreases. In addition, when the fabric is subjected to stretch/release cycles, the resistance changes as observed in tests with thermoplastic polyurethane. FIG. 6 shows the evolution of resistance as a function of stretching (a), and the evolution of resistance as a function of time in stretching/relaxing cycles with different stretching modes (b and c). The graph of FIG. 6 (d) represents the signal obtained when the polyester stretchable fabric on which the composite is deposited is subjected to a "rough" stretching and then released. This movement was carried out manually. Sudden stretching causes a spike and then releasing leads to an instantaneous decrease in resistance which returns to its original value after a few seconds.

Figure 7:
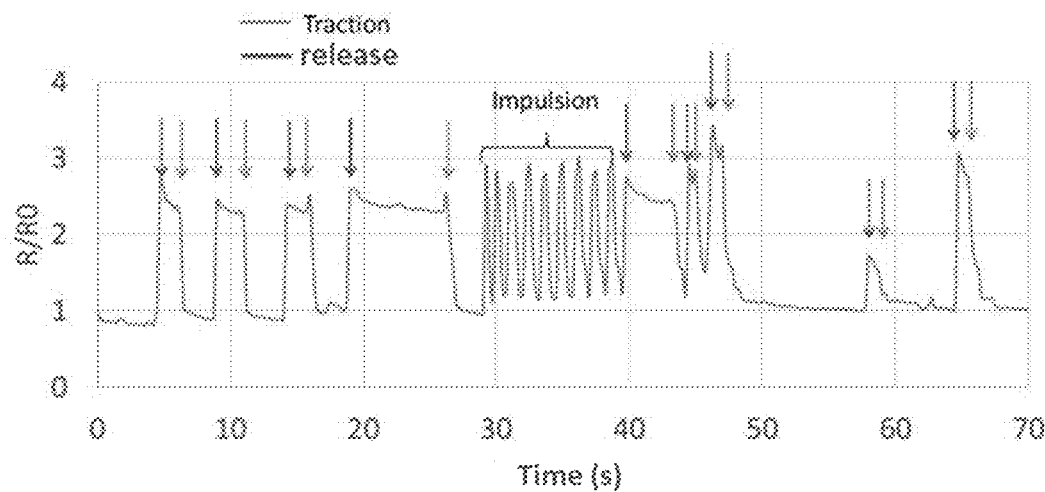
FIG. 7 is a graph showing the signal obtained during various successive manual events with the printed test piece of stretchable fabric.

Finally, the graph of FIG. 7 represents the signal obtained during various successive manual events, be it traction and towed maintenance, or impulsion (traction then instantaneous release). Besides the fact that the material reacts to successive events, the fact that the value of the initial resistance is obtained quickly (a few seconds) is a paramount result. Indeed, this means that the system is not degraded by stretching.

Therefore, the stretchable textile substrate on which the composite is deposited retains its stretchability properties, and the composite deposited on the substrate retains its conductivity properties during stretch cycles.

c) Deposit on a Lycra Substrate

Figure 8:
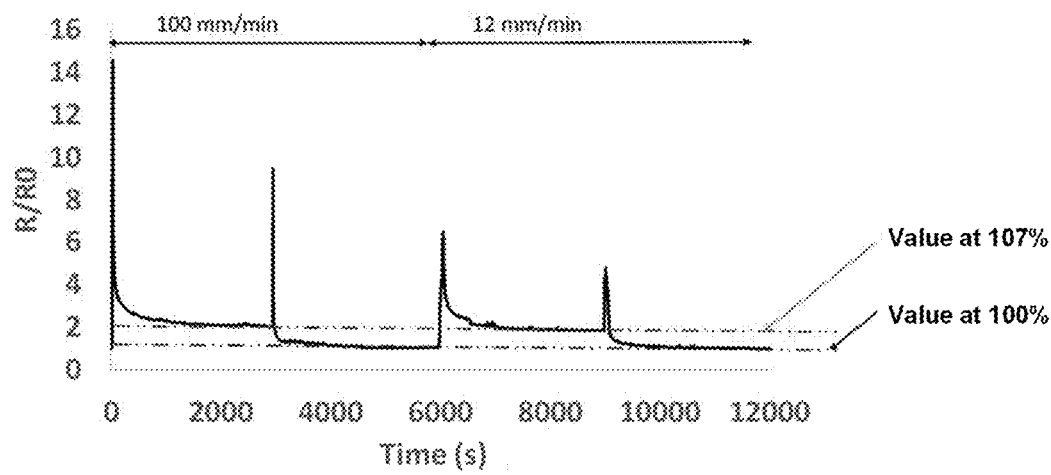
FIG. 8 is a graph showing the evolution of resistance as a function of time during successive stretching/releasing of the printed Lycra test piece.

The two aforementioned composites ((a) composite of particles with a PBuA/PANI ratio of 75/25, a core diameter of approximately 120 nm, a mixture of BrijS 100 and DTAB surfactants (assay 4 of Table 1), and a conductivity of 1.6 S/cm, and (b) composite of particles with a PBuA/PANI ratio of 70/30, a core diameter of about 180 nm, a mixture of BrijS100 and Ninol L5 surfactants (assay 3 in table 1), and a conductivity of 1 S/cm) were also deposited on Lycra. The nature of the mesh of this substrate leads to a behavior different from that obtained with the substrates of the preceding examples. FIG. 8 shows the change in resistance as a function of time during successive stretching/releasing of the test piece.

Despite a loss of percolation (loss of conduction path) observed during stretching of the test piece, the subsequent stabilization of the resistance, probably linked to a rearrangement of the composite, and the fact that the resistance returns to its initial value after relaxation demonstrate the absence of deterioration or degradation of the composite deposited on the Lycra substrate and the maintenance of its conductivity.

d) Deposit on a Stretchable Thread

Figure 9:
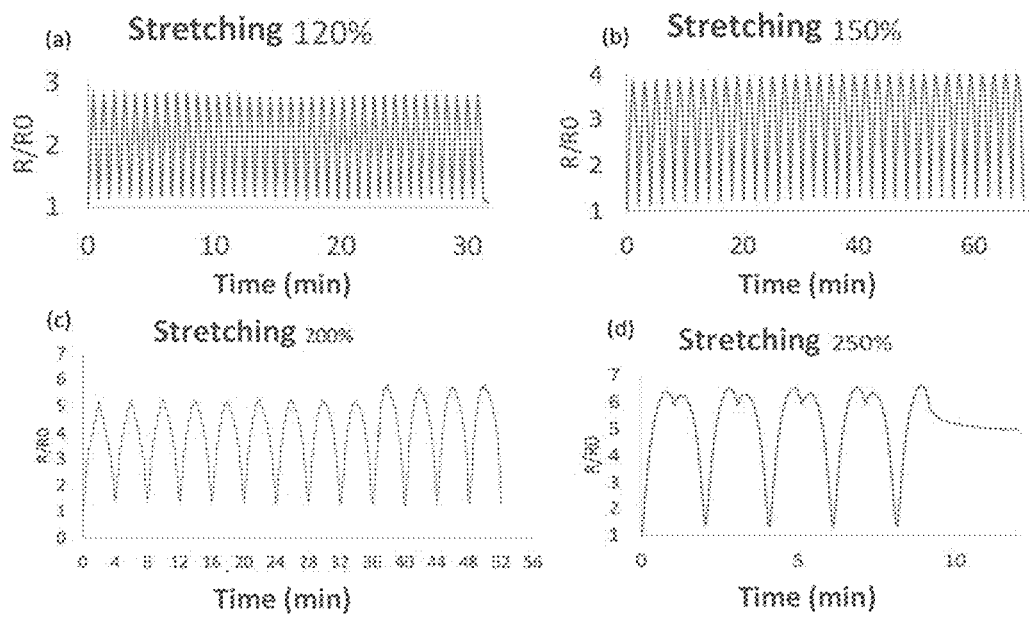
FIG. 9 is a graph showing the evolution of the resistance of the test piece of a printed stretchable thread during stretching/release cycles depending on the stretching.

Each of the above two conductive composites has been coated onto a separate elastic thread composed of 60% elastane and 40% polyester. To do this, and in order to wet all the air-thread interface possible, the thread is first stretched to its maximum, then covered with the conductive composite and kept stretched during drying. Once dry, tests similar to those carried out on thermoplastic polyurethane film or on textiles were carried out, namely the monitoring of resistance as a function of stretching. The observed behavior is identical to that observed previously, the resistance increases during stretching and decreases during relaxation. Thus, cycles were performed at different stretch rates. FIG. 9 shows that the test piece is neither damaged nor degraded by the cycles of stretching undergone, and that the conductivity is retained during stretching and relaxation. The results were obtained for stretches of 120% (a), 150% (b), 200% (c) and 250% (d).

Example 4: Devices Using the Present Invention a) Presence Detector

A Lycra support on which the composite has been deposited is placed between the carpet and a perforated support allowing the carpet+Lycra pair to sink into. The high sensitivity to sudden stretch of this printed material allows detection of a characteristic signal of the step on the mat, even when the stretch is low.

b) Step Detector

A fabric support on which the composite has been deposited is attached under the heel of a sock. Thus, each step causes an impact on the material which results in a measured and detectable resistance peak. Thus, the resistance tracking makes it possible to detect each step.

The invention claimed is:

1. A method of printing on a stretchable support, comprising the steps of providing electrically conductive nanocomposite particles comprising a core consisting of a homopolymer of C1-C6 alkyl polyacrylate or of a copolymer of C1-C6 alkyl acrylate and of an α,β-unsaturated amide comonomer, a shell consisting of polyaniline, and a nonionic surfactant having a hydrophilic/lipophilic balance of between 17 and 19, end-points included, and printing the electrically conductive nanocomposite particles on the stretchable support.

2. The method according to claim 1, wherein the printing is carried out by depositing the electrically conductive nanocomposite particles on the stretchable support in the form of a film, or by impregnating all or part of the fibers of the stretchable support with a solution or a suspension comprising the electrically conductive nanocomposite particles and at least one solvent.

3. The method according to claim 1, wherein the electrically conductive nanocomposite particles further comprise a second surfactant which is a cationic surfactant.

4. The method according to claim 1, wherein the core diameter of the electrically conductive nanocomposite particles is less than 200 nm.

5. The method according to claim 1, wherein the weight ratio of polyalkylacrylate/polyaniline or copolymer of alkyl acrylate with an α,β-unsaturated amide comonomer/polyaniline varies from 70/30 to 95/5.

6. The method according to claim 1, wherein the core consists of a homopolymer of C1-C6 alkyl polyacrylate, said C1-C6 alkyl polyacrylate homopolymer being n-butyl polyacrylate.

7. A printed stretchable support, wherein the print comprises at least one electrically conductive nanocomposite particle comprising a core made of a homopolymer of C1-C6 alkyl polyacrylate or a copolymer of C1-C6 alkyl acrylate and an α,β unsaturated amide comonomer, a shell consisting of polyaniline, and a nonionic surfactant having a hydrophilic/lipophilic balance of between 17 and 19, end-points included.

8. The printed stretchable support according to claim 7, wherein the support is selected from the group consisting of thermoplastic polymers, elastomeric fibers and fabrics comprising elastomeric fibers.

9. The printed stretchable support according to claim 8, wherein the stretchable printed support is selected from the group consisting of polypropylene, polyurethane, poly(ethylene terephthalate), polyethylene, elastane fibers, natural or synthetic rubber fibers, olefins, polyesters, polyethers or combinations thereof.

\* \* \* \* \*